Aug. 25, 1931.  B. LOEFFLER  1,820,749
TORQUE DAMPER
Filed Feb. 28, 1930
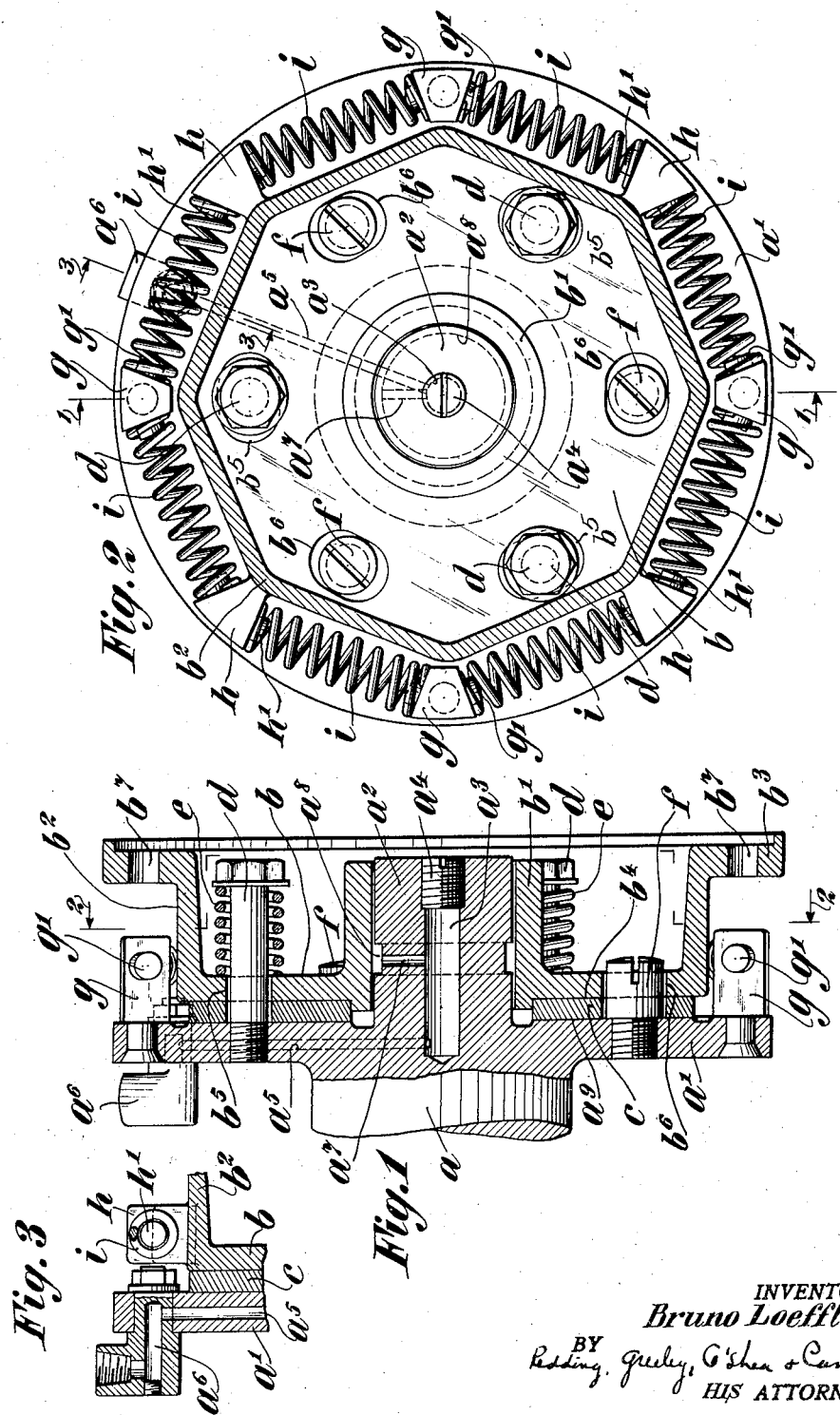
INVENTOR
Bruno Loeffler,
BY
Redding, Greeley, O'Shea & Campbell
HIS ATTORNEYS Patented Aug. 25, 1931

1,820,749

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

TORQUE DAMPER

Application filed February 28, 1930. Serial No. 432,035.

The present invention relates to couplings between power transmitting members and embodies, more specifically, an improved torque cushioning connection for use in a motor vehicle.

The deleterious effects of vibration of the engine of motor vehicles upon the transmission shafts and related driving mechanism, as well as the body of the vehicle, are well known and many devices have been provided with a view to reducing or eliminating such vibrations. A further purpose of these devices is to cushion the transmission of torque to the driven elements in order to provide a more uniform flow of power and relieve the driving element from the stresses consequent to irregularities in the road.

The requirement that a structure must be sufficiently strong has limited the design of mechanisms of this character materially and rendered the provision of adequate cushioning means quite difficult. An object of the present invention, accordingly, is to provide a torque cushioning connection for the drive shafts of motor vehicles which is sufficiently strong and is able to afford the desired cushioning effect between the driving and driven elements.

A further object of the invention is to provide a device of the above character, the elements of which are simple in construction and readily assembled and dismounted to facilitate the servicing thereof.

A further object of the invention is to afford a connection of the above character in which the wear produced by the relative rotation of elements thereof is fully compensated for by the mechanism and thus prevents the impairing of the operation of such elements.

Further objects, not specifically enumerated above, will be apparent as the invention is described in greater detail in connection with the accompanying drawings, wherein:

Figure 1 is a view in transverse section, taken on line 1—1 of Figure 2, and looking in the direction of the arrows.

Figure 2 is a view in section, taken on line 2—2 of Figure 1, and looking in the direction of the arrows.

Figure 3 is a detail view, taken on line 3—3 of Figure 2, and looking in the direction of the arrows.

Referring to the above drawings, $a$ designates a driving shaft upon which may be formed a plate $a'$. It will be apparent that this plate $a'$ may either be integral with the shaft $a$ or may be formed as a separate element and secured thereto in any well known fashion. A hub, coaxial with shaft $a$ is formed with the plate $a'$ and provided with a bore $a^3$, screw $a^4$ serving to close the end of the bore and provide a tight lubricating chamber. Passage $a^5$, formed in the plate $a'$, communicates with a fitting $a^6$ which may be of the usual type for supplying a suitable lubricant to the chamber $a^3$. A radial passage $a^7$ communicates with a circumferential groove $a^8$ in the hub $a^2$, thus affording an adequate supply of lubricant to the cylindrical bearing surfaces thereof.

Upon hub $a^2$, a spider $b$ is mounted, to be formed with a cylindrical flange $b'$ journaled on the hub $a^2$ and a peripheral cylindrical flange $b^2$, the outer extremity of which is formed with a radial flange $b^3$. Surface $a^9$ of the plate $a'$ and surface $b^4$ of the spider $b$ form opposed friction surfaces between which a friction disc $c$ is mounted. A suitable number of spaced bolts $d$ are secured to the disc and extend through elongated apertures $b^5$, formed in the spider $b$. Seated under the heads of the bolts $d$ are springs $e$ which are relatively long and have what is termed a "low rate". In this manner, the expansion of the springs $e$, due to wearing of the disc $c$ has very little effect upon the pressure of such springs as exerted upon the disc $d$. In this manner, a relatively uniform pressure is exerted upon the disc at all times, regardless of its condition of wear.

Between the respective bolts $d$, studs $f$ are mounted, being secured to the plate $a'$ and extending through suitable apertures $b^6$. These studs serve as positive stops to limit the extent of movement between the relatively rotatable member.

The plate $a'$ is provided with lugs $g$ upon which are formed spring seats $g'$. Corresponding lugs $h$ are mounted upon the spider $b$ between the respective lugs $g$, lugs $h$ likewise being formed with springs seats $h'$. Between the opposed seats $g'$ and $h'$ springs $i$ are mounted, thus cushioning relative movement between the driving and driven members.

The driven member, spider $b$, may be secured to a universal joint or other element by means of its radial flange $b^3$, suitable bolt holes $b^7$ being provided for this purpose. From the foregoing, it will be seen that springs $i$ serve to cushion relative movement between the plate $a'$ and spider $b$, the friction disc $c$ also serving to damp out any vibrations which arise in the driving member. The structure affords a maximum amount of strength for a given size, in addition to the greatest possible cushioning and damping effect since the springs $i$ are spaced as far from the axis of the driving member as possible, thus materially increasing the arm through which such springs work. By providing the spider with a peripheral cylindrical flange, as described, a relatively long compression spring $e$ may be used with the advantages enumerated above.

While the invention has been described with specific reference to the plate and spider construction shown in the drawings, wherein the elements are formed as units, it is obvious that the design and arrangement of parts may be modified as desired, the unitary elements being formed of a plurality of assembled parts, without departing from the scope of the invention as defined in the appended claims.

I claim as my invention:

1. A power transmitting device comprising a plate having a hub co-axial therewith, a spider journalled on the hub and rotatable with respect thereto, a cylindrical flange on the spider, bolts on the plate extending parallel to the axis thereof, and to a plane adjacent the plane of the end of the cylindrical flange distant from the plate, enlarged apertures in the spider through which the bolts extend, a friction disc between the plate and spider, and low rate springs seated by the bolts to urge the plate and spider together.

2. A power transmitting device comprising a plate having a hub co-axial therewith, a spider journalled on the hub and rotatable with respect thereto, a cylindrical flange on the spider, bolts on the plate, enlarged apertures in the spider through which the bolts extend, a friction disc between the plate and spider, and low rate springs seated by the bolts to urge the plate and spider together.

3. A power transmitting device comprising a plate having a hub co-axial therewith, a spider journalled on the hub and rotatable with respect thereto, a cylindrical flange on the spider, bolts on the plate, enlarged apertures in the spider through which the bolts extend, and low rate springs seated by the bolts to urge the plate and spider together.

4. A power transmitting device comprising a plate having a hub coaxial therewith, a spider journalled on the hub and rotatable with respect thereto, a cylindrical flange on the spider, a radial flange on the cylindrical flange in opposed relation to the periphery of the plate, and at the end of the cylindrical flange distant from the plate, and means between the last named flange and the plate to resist relative rotation between the two.

5. A power transmitting device comprising a plate having a hub co-axial therewith, a spider journalled on the hub and rotatable with respect thereto, a cylindrical flange on the spider, a radial flange on the cylindrical flange in opposed relation to the periphery of the plate, and means between the last named flange and the plate to resist relative rotation between the two.

6. A power transmitting device comprising a driving and a driven element, a hub formed upon one of the elements concentrically therewith, a cylindrical bearing on the other element engaging the hub, lubricating ducts in the hub for lubricating the bearing, means to cushion relative movement therebetween and friction means to resist such movement.

7. A power transmitting device comprising a driving and a driven element, means to mount one element upon another concentrically therewith, means to lubricate the mounting, means to cushion relative movement therebetween, and friction means to resist such movement.

This specification signed this 24th day of February, A. D. 1930.

BRUNO LOEFFLER.